(12) United States Patent
Zhou et al.

(10) Patent No.: US 6,478,966 B2
(45) Date of Patent: Nov. 12, 2002

(54) SYSTEM FOR EXTRACTING TETRODOTOXIN

(75) Inventors: Maoqing Zhou, Nanning (CN); Frank Hay Kong Shum, North Point (HK)

(73) Assignee: Nanning Maple Leaf Pharmaceutical Co., Ltd., Guangxi (CN)

( * ) Notice: Subject to any disclaimer, the term of this patent is extended or adjusted under 35 U.S.C. 154(b) by 63 days.

(21) Appl. No.: 09/818,775

(22) Filed: Mar. 28, 2001

(65) Prior Publication Data

US 2002/0060188 A1 May 23, 2002

(51) Int. Cl.$^7$ .................. C07D 491/00; B01D 11/02
(52) U.S. Cl. ............ 210/638; 210/263; 210/416.1; 210/511; 422/261; 422/284; 544/247; 435/267; 435/283.1; 435/308.1
(58) Field of Search .................. 544/247; 210/634, 210/638, 263, 416.1, 511; 422/261, 273, 275, 284; 435/267, 283.1, 308.1

(56) References Cited

U.S. PATENT DOCUMENTS

| | | | | |
|---|---|---|---|---|
| 3,661,564 A | * | 5/1972 | Gandon | 75/365 |
| 3,836,337 A | * | 9/1974 | Bruniche-Olsen | 422/273 |
| 3,841,908 A | * | 10/1974 | Giersing | 422/273 |
| 3,932,277 A | | 1/1976 | McDermott et al. | 210/359 |
| 4,490,256 A | | 12/1984 | Nussbaumer et al. | 210/359 |
| 4,713,344 A | | 12/1987 | Markhart, III | 435/287 |
| 4,800,020 A | | 1/1989 | Savas et al. | 210/359 |
| 4,859,336 A | | 8/1989 | Savas et al. | 210/416.1 |
| 4,921,618 A | | 5/1990 | Hamlin | 210/780 |
| 5,073,200 A | * | 12/1991 | Leibig | 422/269 |
| 5,114,858 A | | 5/1992 | Williams et al. | 435/270 |
| 5,124,041 A | | 6/1992 | Sheer et al. | 210/641 |
| 5,288,870 A | * | 2/1994 | Kao | 544/247 |
| 5,456,893 A | * | 10/1995 | Silver | 422/273 |
| 5,549,816 A | | 8/1996 | Harp et al. | 210/120 |
| 5,550,033 A | | 8/1996 | Krumdieck | 435/40.52 |
| 5,601,711 A | | 2/1997 | Sklar et al. | 210/238 |
| 5,700,464 A | * | 12/1997 | Silver | 424/123 |
| 5,786,207 A | * | 7/1998 | Katz | 435/267 |
| 5,989,431 A | | 11/1999 | Evans et al. | 210/643 |
| 6,020,195 A | | 2/2000 | Hu et al. | 435/366 |
| 6,022,477 A | | 2/2000 | Luo et al. | 210/645 |
| 6,090,572 A | | 7/2000 | Crosby | 435/29 |

\* cited by examiner

*Primary Examiner*—Ernest G. Therkorn
(74) *Attorney, Agent, or Firm*—Birch, Stewart, Kolasch & Birch, LLP

(57) ABSTRACT

The invention relates to a system for extracting toxins from biological tissues. The system comprises a lixiviator, an ion-exchange column, a diatomaceous silica-active carbon column, and a vacuum concentrator. Twenty to one hundred kilograms of raw material can be processed at one time when puffer fish ovaries are used as the starting material.

11 Claims, 4 Drawing Sheets

IWT-112 MANUFACTURING FLOW

Figure 1. Flow chart of IWT-112 TTX Extraction System

IWT-112 MANUFACTURING FLOW

| | |
|---|---|
| M108 IWT-113 | V102 Elevated Vessel |
| V107 Elevated Vessel | M101 Vacuum Concentrator |
| V106 IWT-312 | |
| V105 Elevated Vessel | |
| V104 IWT-412 | |
| P103 Pump | |

Figure 2. Lixiviator - Apparatus IWT-113
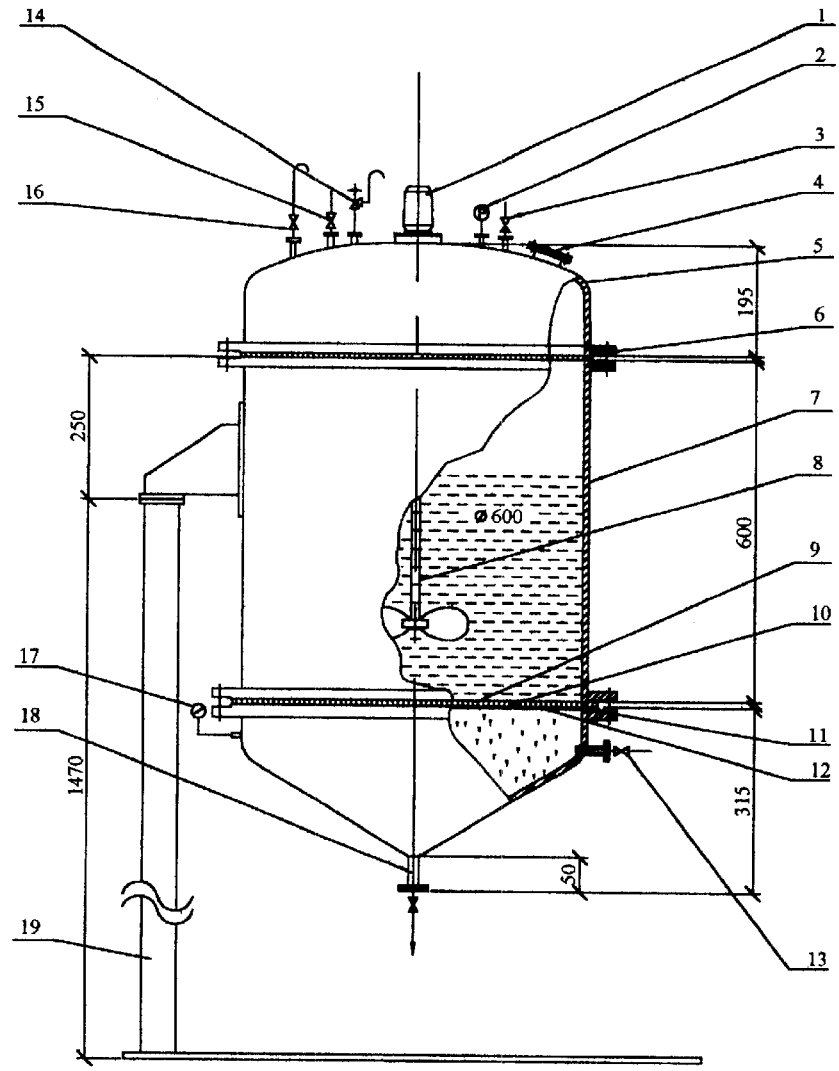
1. Decelerator Joint
2. Pressure Gauge
3. Water Inlet Valve
4. Material Filling Inlet
5. Sealing Head
6. Sealing Washer
7. Barrel Body
8. Propeller Pug Mill
9. Filtering Cloth
10. Filtering Paper
11. Washer
12. Mesh Plate
13. Vacuum Valve
14. Safety Valve
15. Gas Valve
16. Degassing Valve
17. Vacuum Gauge
18. Drain
19. Stand ×4
APPARATUS IWT-113

Figure 3. HPLC profile of TTX obtained in Example 1.

```
Channel A Results

Peak     Time        Area       Area %
-----    --------    --------   --------
  1      14.30       1997377    85.429
  2      16.43         40791     1.745
  3      18.50         30379     1.299
  4      19.87         66839     2.859
  5      21.17        202657     8.668

Totals :
                     2338043   100.000
```

Figure 4. HPLC profile of TTX obtained in Example 2.

| Meas.RT min | Area mAU*sec | Height mAU | Symm. | Area % | Compound Name |
|---|---|---|---|---|---|
| 18.90 | 4873.51 | 171.28 | 0.873 | 79.96 | |
| 20.42 | 42.74 | 0.72 | 0.897 | 0.70 | |
| 22.28 | 27.90 | 0.78 | 1.011 | 0.46 | |
| 25.48 | 71.43 | 2.04 | 1.462 | 1.17 | |
| 26.20 | 152.94 | 3.81 | 1.007 | 2.51 | |
| 27.18 | 10.83 | 0.32 | 0.528 | 0.18 | |
| 28.82 | 795.79 | 18.92 | 0.961 | 13.06 | |
| 33.08 | 119.48 | 1.33 | 0.438 | 1.96 | |

SYSTEM FOR EXTRACTING TETRODOTOXIN

FIELD OF THE INVENTION

This invention relates to apparatus for extraction of tetrodotoxin. The apparatus can be used, inter alia, for batch production of tetrodotoxin or other toxins from animal tissues, for example using the method described in another application of the inventors (application Ser. No. 09/695,711, filed Oct. 25, 2000. Twenty to one hundred kilograms of raw material can be processed at one time when puffer fish ovaries are used.

BACKGROUND OF THE INVENTION

A method for extraction of tetrodotoxin from animal tissues is described in a prior patent application of the inventors (U.S. application Ser. No. 09/695,711, filed Oct. 25, 2000. That method comprises five steps as follows:

Step 1: Grind the tissues into small pieces, soak with an amount of water equal to 1.5 times by weight of the tissues and an amount of a weak organic acid, typically a carboxylic acid, preferably acetic acid, equal to 0.05%–1%, preferably 0.1%–0.3%, by weight of the tissue for several hours, then stir and filter quickly to obtain a lixiviated solution. Repeat this step 3–4 times in order to extract as much toxin as possible.

Step 2: Heat the lixiviated solution to 70–95° C. to coagulate and remove soluble proteins ("scleroprotein").

Step 3: Adjust the pH of the lixiviated solution obtained in step 1 to 6.0~7.5 using an aqueous solution of a weak base, then put the solution through a weakly acidic cation ion-exchange resin to enrich tetrodotoxin. Elute the bound tetrodotoxin with a weak acid.

Step 4: Adjust the pH of the obtained tetrodotoxin solution in step 3 to a range between 8 and 9 for a period of 2–4 hours, during which the solution is put through a column filled with active charcoal and diatomaceous silica so as to remove inorganic salts and a fraction of the alkaline amino acids. Tetrodotoxin binds the immobile phase, which is washed with de-ionized water, then the toxin is eluted with acidic ethanol solution.

Step 5: Purify and crystallize the tetrodotoxin by concentrating the solution obtained in step 4 under vacuum, then adjusting to an alkaline pH. Vacuum dry the obtained tetrodotoxin crystals, typically about 24 hours until the weight of the crystals becomes constant.

The method as described above can be run in either a batch mode or a continuous mode, but is typically run in a batch mode. The extraction system described herein is an efficient system for continuous production. A production cycle can be completed within a period of 6–7 days providing that the extraction is conducted 24 hours a day and 20–100 kg puffer fish ovaries are loaded at one time. For a load of 20 kg material, 0.8–1.2 grams tetrodotoxin can be obtained; for a load of 100 kg, 4–6 grams can be obtained.

SUMMARY OF THE INVENTION

The extraction system of this invention is named IWT-112 (See FIG. 1). An important component of the IWT-112 system is a lixiviating and filtering apparatus ("lixiviator", device IWT-113). Additional components are a heater, an ion-exchange column, a diatomaceous silica-active carbon column, a vacuum concentrator etc. The components of the system are arranged so that liquids flow from the outlet of one device into the inlet of the next device. For continuous mode operation, it is possible to arrange the downstream components so that a batch run from the lixiviator is directed to one of several sets of series of the downstream components. Flow through the system can be driven either by gravity or by pressure differential established across each component separately or across the system as a whole or across various subsets of the components. For instance, a pressure differential can be established across the cation-exchange column and the diatomaceous silica-activated charcoal column while at the same time a vacuum is drawn on the decompression chamber of the lixiviator by an appropriate arrangement of valves and pressure and vacuum lines. Such a mode of operation might be utilized, for example, when starting a second extraction in the lixiviator while the chromatography steps are being completed on a first extraction.

Lixiviator (Device IWT-113, FIG. 2)

Device IWT-113 functions to lixiviate and filter. It is made of metals, preferably a corrosion-resistant material like stainless steel. It comprises three dismountable parts, namely a "sealing head" at the top, a "lixiviating barrel" in the middle and a "decompressing chamber" at the bottom.

The sealing head comprises a deceleration joint (1), a pressure gauge (2), a water inlet valve (3), a material filling inlet (4), a safety valve (14), a gas valve (15) and a degassing valve (16). The deceleration joint (1) transmits power to the propeller pug mill (8) by connecting a decelerating motor at a speed of 60–120 rpm so as to enable faster lixiviation and filtration by stirring. The propeller pug mill (8) can also help remove used raw material. The water inlet valve (3) is used to provide water for repeated lixiviation steps. After lixiviation, water can be supplied through the water inlet valve (3) to help pump out the used raw material from the material filling inlet while stirring.

The safety valve (14) controls the pressure inside the lixiviating barrel. The pressure is typically 0.5–1.5 kg per square centimeters while filtering. The pressure can be elevated up to 6 kg per square centimeters when necessary. The gas valve (15) maintains the pressure inside the lixiviating barrel by connecting to an air-compressing unit, whereas the degassing valve (16) functions to release the pressure inside the barrel.

The sealing head (6) is removably attached to the lixiviator. The sealing head is typically bolted on, but any removable joiner, for example a clamping device, that can seal the sealing head against the lixiviating barrel and can tolerate the pressurization can be used. A gasket for effecting a pressure seal can be inserted between the sealing head and the lixiviator barrel. The gasket material can be any typical pressure gasket material, preferably an elastomeric material that is resistant to weak acid solutions.

Filtering material (9, 10) is mounted between the decompressing chamber and the lixiviator barrel. During the lixiviation process, the filtration can be speeded by elevating the pressure in the lixiviation barrel or reducing pressure in the decompression module. The filtering material is made from filtering paper, filtering cloth and other porous filtering material that is compatible with use between stainless steel components. "Compatible with use between stainless steel components" means that the filter material will at least not promote electromotive corrosion of the stainless steel.

The filtering material can be for example, a nylon mesh having 100 to 200 meshes per square inch, a stainless steel mesh having 40 to 60 meshes per square inch, or a porous metal plate having a pore diameter of from 2 to 10 mm, preferably from 2 to 4 mm, more preferably 2.5 to 3.5 mm. These materials can be combined in a layered arrangement. Thus, the filter material can be a combination for example, of a nylon mesh having 100 to 200 meshes per square inch, middle to high speed filtering paper, a stainless steel mesh having 40 to 60 meshes per square inch, and a porous metal plate having a pore diameter of 3 mm. A preferred arrangement is to have a metal plate on the bottom, upon which is stacked a stainless steel mesh, a filtering paper and then nylon mesh on top.

The filter is preferably installed in a frame that can be removed from the lixivating/filtering apparatus for easy cleaning and maintenance. Also, the filter is preferably mounted in an elastomeric material suitable for maintaining a pressure seal between the filter and the walls of the lixiviator barrel and/or decompression chamber.

A vacuum valve (13) is installed on the side of the decompression chamber, and a drain (18) at the bottom.

The lixiviator can be mounted on a stand (19).

A heater can be fitted to the lixiviator. The heater should be capable of heating the liquid to a desired temperature and maintaining that temperature. The heater can be an oil-bath heater or steam heater of industry standards. Alternatively, the filtered solution collecting in the decompressing chamber at the bottom of the lixiviator can be passed to a separate heated vessel.

A second filtering apparatus is connected to the outlet of the lixiviator or of the separate heated vessel. The second filtering apparatus can be integral with the separate heated vessel. The filtering material of the second filtering apparatus functions to remove precipitate from the heated filtrate. The filtering material of the second filtering apparatus can be made from material similar to that of the filter between the lixiviator barrel and decompression chamber of the lixiviator. However, the filtering material of the second filtering apparatus is more preferably one having a smaller pore size, sufficient to remove small bits of precipitated protein so that such precipitate does not interfere with subsequent chromatographic steps. The filtering material for the second filtering apparatus preferably includes a middle to high speed filtering paper, in order to separate out the smaller bits of precipitated protein. The order of the filtering material components is the same as that of the first filter. Also, rather than "mesh" type filtering material, an membrane type filter, typically made from nylon or other polymeric material, suitable for filtration driven by a pressure differential is preferred as the filter material for the second filtration apparatus.

The second filtering apparatus is preferably operable by pressure differential and therefore the second filtering apparatus and the separate heated vessel may comprise appropriate connections to pressure or vacuum lines and appropriate relief valves as needed.

Ion-exchange Column (Device IWT-312)

An ion-exchange column (IWT-312) is used to remove proteins, peptides and their derivatives from the tetrodotoxin solution during enrichment and purification of tetrodotoxin. If not removed, these substances produce a high viscosity solution and also interfere with precipitation of the tetrodotoxin later in processing.

Diatomaceous Silica-active Charcoal Column (Device IWT-412)

A column comprising diatomaceous silica and activated charcoal is used to remove basic amino acids remaining in the eluate from the ion-exchange column.

BRIEF DESCRIPTION OF THE DRAWINGS

FIG. 1—Flow chart of IWT-112 TTX Extraction System.
FIG. 2—Lixiviator—Apparatus IWT-113.
FIG. 3—HPLC profile of TTX obtained in Example 1.
FIG. 4—HPLC profile of TTX obtained in Example 2.

DETAILED DESCRIPTION OF THE INVENTION

The extraction procedure using the system of this invention comprises:

1. Lixiviation with Water

20–100 kg toxic tissues, for example ovaries of puffer fish, are crushed into pieces less than 1 cc$^3$, and put into a IWT-113 lixiviator (See FIG. 2). The lixiviator is filled with de-ionized water to 1.5 times the weight of the ovaries and acetic acid is added to 0.1 to 1% by weight of the ovaries. The propeller pug mill is run to stir the mixture for a few hours at room temperature. The vacuum pump is run to decompress the decompression chamber and begin filtering f or several minutes. Then the compressor is run to adjust the pressure at the upper part of the lixiviator to 0.5 to 1 kg/cm$^2$. The filtrate is collected, then heated quickly to 70–90° C. for 3–24 minutes. The filtrate is cooled and again filtered to remove the precipitate. The clarified filtrate is a yellow transparent liquid, called "first clear lixiviated liquid".

The lixiviation is repeated as above and the second lixiviated clear liquid is collected. Repeat the lixiviation process to obtain the third and the fourth lixiviated liquids. The fourth lixiviated liquid is collected only when extremely or highly toxic tissues are used. For mildly toxic tissues, only the third lixiviated liquid is obtained.

The first, second, third (and fourth) lixiviated liquids are pooled, and the toxin content of the liquid is determined by bioassay or high performance liquid chromatography (HPLC).

See, e.g. Chinese patent application 00132673.2, filed Nov. 22, 2000, or U.S. application Ser. No. 09/818,863, filed Mar. 26, 2001.

2. Ion-Exchange Enrichment and TTX-Separation Process

The pH of the pooled clear lixiviated liquid is adjusted to 6.0–7.5, preferably using a strong amine base, typically ammonia. Any precipitate that forms should be removed, e.g by filtration. The clear lixiviated liquid is then put through a cation-exchange resin column (Device IWT-312). A preferred resin is a weakly acidic ammonium cation ion-exchange resin, such as D-152 (Nankai University Chemical Factory, Tianjing, P. R. China.) A typical flow rate for loading the column is 2000 to 3750 mL/hr. Thin layer chromatography (TLC) on a silica plate is used to monitor whether or not toxin leaks from the outflow. TLC can be performed on a silica gel thin-layer plate eluted with n-butanol: acetic acid: water (2:1:1). TTX can be detected by spraying the plate with 10% KOH solution after it is eluted, baking for 10 minutes at 110° C., and observing under a 365 nm ultraviolet lamp. TTX is detected as blue fluorescent spots with $R_f$=0.38–0.40. If toxin leaks, the resin column should be replaced with a new one immediately.

After all the clear lixiviated liquid passes through the column, the column is washed with de-ionized water until there is no protein present in the outflow. The outflow can be monitored for protein content by any typical method in the art, for example by measuring absorbance of 280 nm light. The column is then eluted with a solution of 5 to 12% (by volume) of a weak organic acid, preferably acetic acid, in water, typically at a flow rate of 500 to 2500 mL/hr. The eluate is collected in fractions, preferably of about 1500 mL per portion, and each fraction is assayed for TTX content by thin layer chromatography (TLC).

3. Purification with Active Charcoal

The eluate from the ion-exchange column that contain TTX are pooled and the pH of the solution is adjusted to 8 to 9 with a strong base, preferably aqueous ammonia. The pH is maintained for a period of 2 to 4 hours, within which time the solution is passed through a column that is packed with active charcoal and diatomaceous silica. The diatomaceous silica-active carbon column comprises two layers, with the upper layer being diatomaceous silica and the lower layer being active charcoal. The layer of diatomaceous silica has a 1/10 to 1/2, preferably 1/10–1/5, the thickness of the layer of active charcoal.

The column is washed with de-ionized water, then eluted with an ethanol solution that contains acid (the concentration of ethanol is between 0.5% to 40%, preferably 15% to 30% by volume; the concentration of the acid is from and 0.2 to 0.6% by volume. The acid is preferably a weak organic acid, typically acetic acid. Elution of TTX from the column can be monitored by TLC.

Concentration and Crystallization

The eluate from the silica-charcoal column is concentrated by vacuum evaporation of the solvent, preferably to about 1/10th the volume, Or about 0.5–1 mL per kilogram raw material used. The concentrated solution is cooled to 18–25° C. (room temperature) and the pH is adjusted 8 to 9. A strong amine base, preferably ammonia, is used to adjust the pH. The solution is left standing to precipitate TTX. The crystalline TTX is collected, preferably by filtration and then washed with de-ionized water several times. The crystalline TTX is dried, for example by vacuum evaporation, and redissolved in a dilute solution of an organic acid, preferably acetic acid. The acid solution has a concentration of about 3–7%, preferably 5%, by volume of the acid. The pH is again adjusted to 8 to 9 as above and the TTX is reprecipitated, washed and dried as above. The recrystallization can be repeated, e.g. another 1 or 2 times. The TTX crystals obtained are dried to constant weight and the purity of the produc is determined by HPLC.

EXAMPLES

The following examples serve to illustrate the invention, but are in no way intended to limit the invention.

Example 1

Twenty kilograms ovaries of puffer fish were ground into pieces less than 1 $cc^3$, and put into an IWT-113 lixiviator. Thirty liters de-ionized water and 30 milliliters acetic acid were added. The propeller pug mill was started to stir the mixture for 10 hours at room temperature. Then a vacuum pump was run to enable the filtrate start flowing out from the lixiviator, followed by turning on an air compressor to speed the filtration. After filtering, another 30 liters de-ionized water was added to repeat the lixiviation process. The lixiviation process was repeated totally four times.

The filtrates were merged, and then heated at 80° C. for 5 minutes. After cooling down, the filtrates were sent into a second IWT-113 lixiviator to separate out the precipitated scleroprotein and obtain clear liquid. The pH of the clear liquid was adjusted to 7.5 using aqueous ammonia. Then the solution was put through an ion-exchange column (device IWT-312) which was a $NH_4^+$ weakly acidic cation ion-exchange resin (D-152, (Nankai University Chemical Factory, Tianjing, P. R. China.) column having a diameter of 6 cm and a height of 1 meter, filled with resin by Nankai University Chemical Factory, Tianjing, China. After the solution all passed through, the column was washed clean with de-ionized water, then was eluted with 10% aqueous acetic acid solution to get a TTX eluate. Subsequently, strong aqueous ammonia was used to adjust the pH of the TTX eluate to 8.5. The resulting solution was put through a diatomaceous silica-active charcoal column (device IWT-412), in which a diatomaceous silica layer was placed above an active charcoal layer, and the diatomaceous silica layer was 1/15 the thickness of the active charcoal layer. The TTX was adsorbed on the active charcoal. Then a 20% aqueous ethanol solution containing 0.2% acetic acid was used to elute TTX, and the eluate was put into a rotating evaporator to concentrate to about 15 milliliters. After cooling to 22° C., the pH of the concentrated solution was adjusted with concentrated ammonia to 9, and the solution was put into a refrigerator to be cooled further and to crystallize the TTX. The crystals were separated out and dissolved in 5% acetic acid, then the pH of the resulting solution was adjusted with strong ammonia to 9, and TTX in the solution was crystallized and precipitated again. Next, the TTX crystals were placed in a vacuum drier and were dried for 24 hours so that their weight became constant. The TTX content of the dried product was determined by high performance liquid chromatograph (HPLC) to be 85.4% (See FIG. 3). From 20 kilograms ovaries, 1210 milligrams TTX crystals were obtained, an equivalent of 6.05 grams per 100 kilograms ovaries.

Example 2

One hundred kilograms puffer fish ovaries were ground, and 150 L water and 150 mL 0.5% acetic acid were added. The tissue was lixiviated and the remaining process steps were performed as in Example 1. 5.82 g TTX crystals of 80.0% purity by HPLC were obtained (See FIG. 4).

We claim:

1. A system for extracting compounds from biological tissues comprising:

a) a lixiviating and filtering apparatus, comprising a sealing head at the top, a lixiviating barrel in the middle and a decompressing chamber at the bottom, wherein the sealing head comprises a gas inlet valve connecting to a pressurizing source and a degassing valve, and the decompressing chamber comprises a connection to a vacuum source;

wherein a filtering material compatible with stainless steel components and capable of sustaining a pressure differential of from 0.5–6.0 kg per square centimeter, without rupturing is mounted between the decompressing chamber and the lixiviator barrel;

b) a heater that is fitted to the lixiviating and filtering apparatus or is alternatively a separate heated vessel connected to the decompressing chamber of the lixiviating and filtering apparatus;

c) a second filtration apparatus connected to an outflow from the lixiviating and filtering apparatus or alternatively to the outflow of the separately heated vessel;

d) a cation exchange column connected to the outflow of the second filtration apparatus;

e) a diatomaceous silica-active carbon column connected to the outflow of the cation exchange column and comprising two layers, an upper layer of diatomaceous silica and a lower layer of active charcoal;

f) an apparatus for vacuum evaporation of a solvent connected to the outflow of the diatomaceous silica-active carbon column.

2. The system of claim 1, wherein the sealing head of the lixiviating and filtering apparatus comprises a deceleration joint, a pressure gauge, a water inlet valve, a material filling inlet, and a safety valve.

3. The system of claim 1 or claim 2, wherein the lixiviating barrel of the lixiviating and filtering apparatus comprises a propeller pug mill and a deceleration joint that transmits power to the propeller pug mill by connecting a decelerating motor.

4. The system of claim 1 wherein the filtering material of the lixiviating and filtering apparatus comprises one or more of nylon filtering mesh, stainless steel mesh, filtering paper and a porous metal plate.

5. The system of claim 1, wherein the filtering material in part a is capable of sustaining a pressure differential of from 0.5–1.5 kg per square centimeter.

6. The system of claim 1, wherein the filtering material of the lixiviating and filtering apparatus is a combination of a nylon filtering mesh, a stainless steel mesh, a filtering paper and a porous metal plate.

7. The system of claim 6, wherein the nylon filtering mesh has 100–200 meshes per square inch, the filter paper is a middle-high speed filtering paper, the stainless steel mesh has 20–100 meshes per square inch, and the porous metal plate has a pore diameter of 2.5 to 3.5 mm.

8. The system of claim 7, wherein the stainless steel mesh has 40–60 meshes per square inch.

9. The system of claim 1, wherein in the diatomaceous silica-active carbon column, the layer of diatomaceous silica has a thickness $1/10$ to $1/2$, of the thickness of the layer of active charcoal.

10. The system of claim 9, wherein the layer of diatomaceous silica has a thickness of $1/10$ to $1/5$ of the thickness of the layer of active charcoal.

11. A method for extracting tetrodotoxin from biological tissues comprising extracting the tetrodotoxin from the tissues with the system of claim 1.

* * * * *